United States Patent
Belisle

[11] Patent Number: 5,901,666
[45] Date of Patent: May 11, 1999

[54] PET DISPLAY CLOTHING

[76] Inventor: Brice Belisle, 112 Conselyea St., Brooklyn, N.Y. 11211

[21] Appl. No.: 08/920,217

[22] Filed: Aug. 25, 1997

[51] Int. Cl.$^6$ .................................................. A01K 29/00
[52] U.S. Cl. .......................................................... 119/497
[58] Field of Search .................................. 119/452, 417, 119/421, 857, 497; 2/75, 69, 247, 102; 224/148.1, 148.2

[56] References Cited

U.S. PATENT DOCUMENTS

| | | | |
|---|---|---|---|
| 3,687,110 | 8/1972 | Braunhut | 119/1 |
| 3,859,961 | 1/1975 | Willinger | 119/15 |
| 4,265,381 | 5/1981 | Muscatell | 224/148 |
| 5,176,102 | 1/1993 | Tracy | 119/19 |
| 5,263,618 | 11/1993 | Talavera | 224/148 |
| 5,277,148 | 1/1994 | Rossignol et al. | 119/19 |
| 5,303,425 | 4/1994 | Mele | 2/115 |
| 5,419,281 | 5/1995 | Williams | 119/19 |
| 5,445,302 | 8/1995 | Holtorf | 224/209 |
| 5,548,842 | 8/1996 | Wiseman, Sr. | 2/69 |
| 5,664,525 | 9/1997 | Phillips et al. | 119/452 |

*Primary Examiner*—Thomas Price
*Attorney, Agent, or Firm*—Robert W. J. Usher

[57] ABSTRACT

A vest or belt is integrally formed with tubular, pet receiving passageways which extend around the wearer's body and terminate in pocket-like chambers for feeding and retrieval. Outer wall portions of the passageways are transparent so that a pet moving along the passageways can be seen by a spectator. Graphics or indicia depicting the pet's habitat or a pet story are marked on the vest and extend across portions of the passageways masking delineations or depicting the passageways as burrows.

14 Claims, 1 Drawing Sheet

U.S. Patent  May 11, 1999  5,901,666
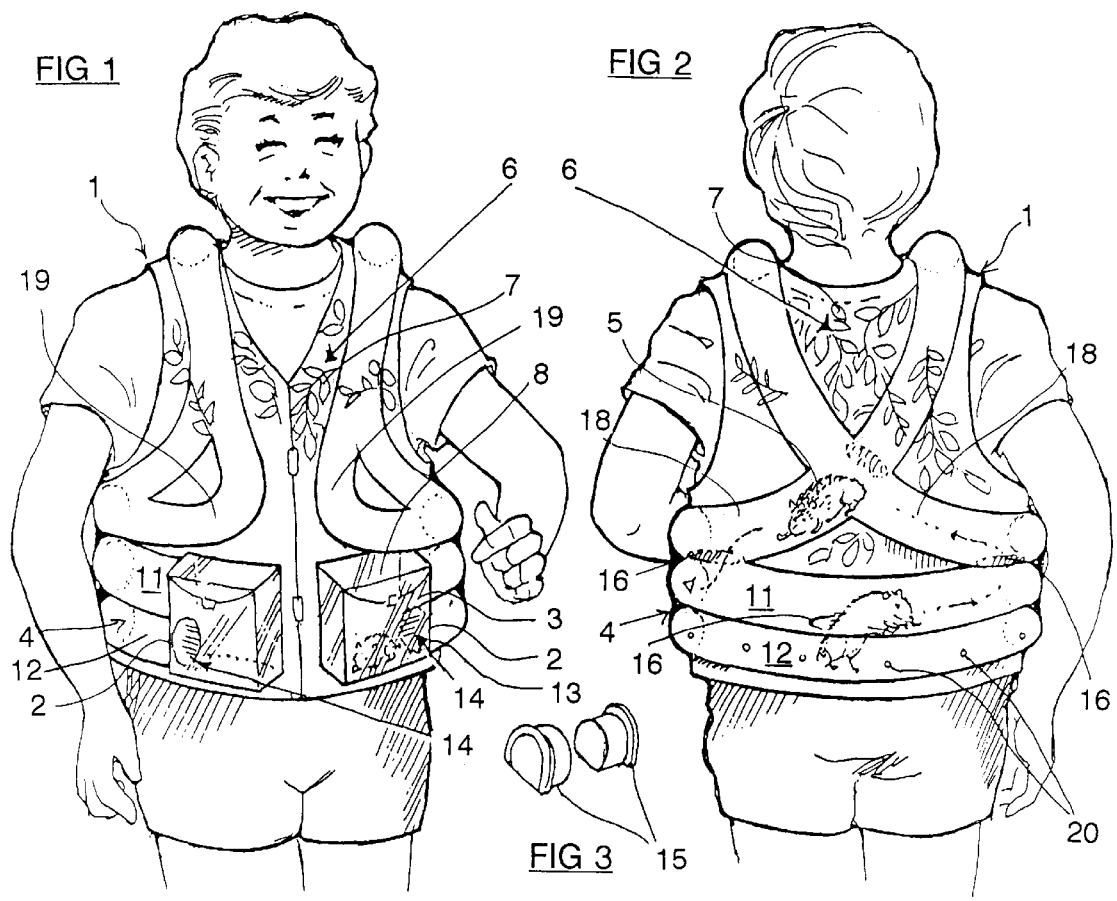
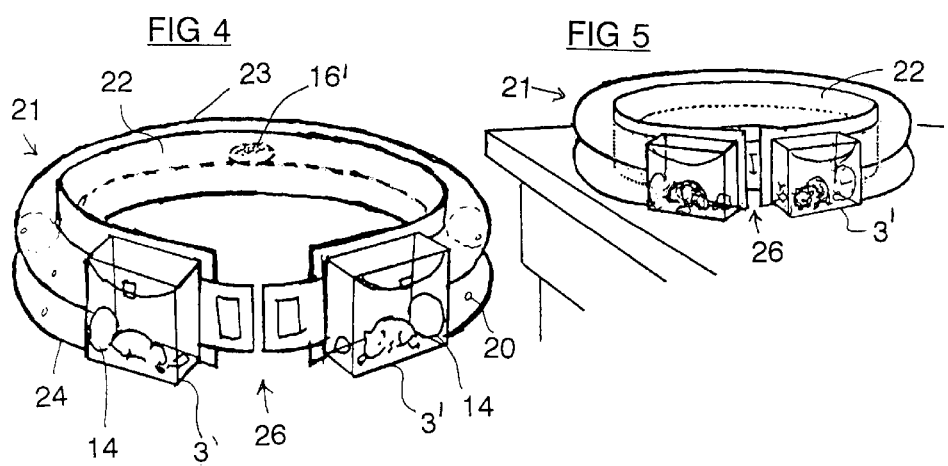

PET DISPLAY CLOTHING

FIELD OF THE INVENTION

The invention relates to clothing for transporting and displaying small pets while worn by a person.

BACKGROUND OF THE INVENTION

Various prior proposals teach portable animal containers said to be wearable insofar as they are supported by a person's body. For example, U.S. Pat. No. 5,176,102 issued January 1993 to Tracy; U.S. Pat. No. 5,277,148 issued 1994 to Rossignol et al; U.S. Pat. No. 5,419,281 issued 1995 to Williams; and U.S. Pat. No. 5,445,302 issued 1995 to Holtorf all teach individual animal containers having shoulder straps for support by a person's body.

However, in the main, the above are intended for relatively large pets, such as cats and small dogs, and the containers protrude a substantial distance from the carrier's body which can be cumbersome and provide only very limited pet display in particular as the pets are substantially immobilized.

U.S. Pat. No. 3,859,961 issued 1975 to Willinger et al teaches a discrete animal path connecting system comprising rigid, perforate, transparent tubing that may be connected into a variety of configurations so that rodents can be viewed while moving therealong.

However, none of the above is suggestive of the present invention.

SUMMARY OF THE INVENTION

An object of the invention is to provide pet display clothing having one or more, at least partly transparent, enclosed, pet receiving, passageways or tunnels extending across a surface thereof so that pets traversing the passageways or tunnels can be viewed by a spectator while the clothing is worn by a person.

More particularly, the invention provides a pet display vest having an elongate, enclosed, pet receiving, passageway extending thereacross with at least one closable pet admitting entry, at least part of the passageway being transparent so that, when the vest is worn, a pet moving along the passageway across a wearer's body can be viewed by a spectator.

In another embodiment, the invention provides a pet display belt having an enclosed, pet receiving, passageway extending therearound with at least one closable pet admitting entry and means for releasably securing the passageway extending around a waist of a person, at least part of the passageway being transparent so that, when the belt is worn, a pet moving along the passageway across a wearer's body can be viewed by a spectator.

BRIEF DESCRIPTION OF THE DRAWINGS

Specific embodiments of the invention will now be described by way of example only and with reference to the accompanying drawings FIG. 1 is a front view of a pet display vest worn by a user, according to a first embodiment of the invention;

FIG. 2 is a rear view of the pet display vest;

FIG. 3 is a perspective view of two plugs:

FIG. 4 is perspective view of a pet display belt in unfastened position according to a second embodiment; and, FIG. 5 is a schematic of the pet display belt in fastened position supported on a flat surface providing a permanent home for a pet.

DESCRIPTION OF PARTICULAR EMBODIMENTS

As shown in FIG. 1 and 2, the pet display vest or waistcoat 1 incorporates a pair of front, waist level pockets 2 forming animal receiving chambers 3 which communicate with a system of enclosed, animal receiving passageways 4 which encircle the waist areas and extend up and across the chest and back areas and over the shoulder areas defining a tortuous, labyrinthine crawl path for rodent-like pets 5, such as hamsters or mice. The entire vest is made from a soft, clear, plastic material such as vinyl (8–10 mil.) so that, when the vest is worn it can conform to the shape of a wearer's torso and the pets 5 can be observed by a spectator both when in the chambers 3 and moving along the passageways 4 across the wearer's torso. Panel portions 6 of the vest 1 are printed with graphics 7 depicting the pets' natural habitat which extend partly over the passageways 4 to mask the fact that the passageways provide predetermined paths providing the impression that the pets are moving randomly within the clothing across the wearer's torso, to reinforce the impression that the passageways are an intimate, integral part of the vest, and that the pet is in the depicted habitat. Alternatively, the graphics depict scenes from an animal tale story book, (e.g. mouse tea party, mouse trip to town, etc,) or the graphics may depict the passageways as tunnels or burrows.

As shown, the chambers 3 are rectanguloid, box-form structures having top closure flaps 8 for providing manual access to the pets and suitably secured in a closed condition by a multiple intermeshing hook and eye type fabric such as that sold under the trade name VELCRO. Opposite ends of a pair of waist encircling, upper and lower, tubular passageway portions 11, 12 are attached to opposite minor sidewalls 13 of respective chambers 2 with the lower portion 12 opening into the respective chambers 3 via circular animal admitting ports 14 for which hemicylindrical, pet barring, closure plugs 15 (FIG. 3) are provided which permit passage of fluids. The pair of passageway portions 11,12 are located adjacent each other for substantially their entire length and intercommunicate via an animal admitting port 16 in abutting wall portions. The upper passageway portion 11 communicates at opposite sides of the body via ports 16 with tubular passageway portions 18 which extend across the back area intersecting, in the center thereof, up and over both shoulders, halter fashion, and down opposite sides of the chest area where they each divide and reunite art the armpit, forming an additional closed loop portion 19. The interior surfaces of the passageways are textured or roughened to enhance the pets grip or traction and a series of ventilation holes 20 are formed at suitable locations, for example, along upper and outside portions.

It will be appreciated that the corners and seams of the chambers are reinforced to increase rigidity and provide crush resistance while the tubular passageway walls are flexible and, although shown expanded apart, may be collapsed for wearer comfort and, as many rodents are happy to force the wall material apart in a burrowing or tunneling action. However, the wearer should take care to avoid risk of crushing a pet by avoiding collisions or falls.

In an alternative version, the tubular portions may be preformed with greater cross-sectional rigidity to provide crush resistance.

The vest 1 can be made by a vacuum forming process in which the passageway portions are formed by bonding longitudinal edges of channel shaped strips of vinyl to a body engaging vinyl panel by a heat welding process similar to that conventional in the manufacture of inflatable vinyl toys. The chamber material is similarly bonded to the vest panel.

As shown in FIGS. 4 and 5, the pet display belt 21 is of somewhat similar construction to the lower or waist section of the vest as upper and lower annular, tubular, passageway portions 23 and 24 joined along their entire lengths, as indicated schematically by the broken lines in FIG. 4 and 5, and are integral with annular waist band forming strip 22, (also of heat sealable plastic), with the lower passageway portion 24 being attached to respective pocket-form animal receiving chambers 3' also attached to the waist band, and communicating with each other via a port 16'. Adjustable fastening members 26 of intermeshing multiple hook and eye type fabrics are provided on opposite ends of the waist band to secure the display belt about the waist of a wearer. When the belt is not worn it may be supported by a flat surface to provide a permanent home for the pets, as illustrated in FIG. 5.

In use, the pockets provide access of the wearer's hand for pet recovery and, feeding areas. Fluid wastes tend to gravitate to the pocket facilitating collection and removal while the passageways and pockets can be rinsed by attachment to a faucet.

Either article of clothing, could accommodate many different small such as mice, hamsters, gerbils, snakes and, possibly even insects. The vest could be provided with sleeves to form a coat or jacket and be of increased length to form an overcoat.

What I claim is:

1. A pet display vest for a person, having an elongate, enclosed, pet receiving, passageway extending thereacross with at least one closable pet admitting entry, at least part of the passageway being transparent so that, when the vest is worn, a pet moving along the passageway across a wearer's body can be viewed by a spectator.

2. A pet display vest according to claim 1 wherein at least the passageway is made from waterproof material and provided with ventilation apertures.

3. A pet display vest according to claim 2 which is made from a flexible plastic material.

4. A pet display vest according to claim 1 wherein the passageway extends at least partly around a body of the wearer.

5. A pet display vest according to claim 1 including a panel portion marked with indica depicting scenes of one of a natural habitat of a pet and a story line of a pet, the indicia extending across part of a passageway.

6. A pet display vest according to claim 1 wherein said at least one closable pet admitting entry comprises a pet receiving chamber of larger cross-sectional size than a maximum cross-sectional size of the passageway and having a closure member movable to an open position so as to permit hand access to the chamber for manual pet removal.

7. A pet display vest according to claim 6 wherein said pet receiving chamber forms a pocket located at a front of a waist portion of the vest.

8. A pet display vest according to claim 6 wherein said at least one closable pet admitting entry comprises two pet receiving chambers forming respective pockets located on respective opposite sides of a front of a waist portion of the vest, each chamber being of larger cross-section than the passageway and having a closure member movable to an open position so as to permit hand access to the chamber for manual pet removal.

9. A pet display vest according to claim 1 wherein said passageway extends around a waist portion, across a back portion and over shoulder portions of the vest.

10. A pet display belt comprising an elongate, enclosed, pet receiving, passageway with at least one closable pet admitting entry and means for releasably securing the passageway extending around a waist of a person, a vent means in the passageway for providing air to a pet therein, at least part of the passageway being transparent so that, when the belt is worn by a person, a pet moving along the passageway around a wearer's waist can be viewed by a spectator.

11. A pet display belt according to claim 10 wherein said at least one closable pet admitting entry comprises two pet receiving chambers forming respective pockets located on respective opposite sides of a front of the belt, each chamber being of larger cross-section than the passageway and having a closure member movable to an open position so as to permit hand access to the chamber for manual pet removal.

12. A pet display belt according to claim 10 wherein at least the passageway-forming passageway is made from waterproof material.

13. A pet display belt according to claim 11 which is made from a flexible waterproof plastic material.

14. Pet display clothing for a person having an inner layer and an outer layer providing between them a pet receiving enclosure with at least one, closable, pet admitting entry thereto, at least part of the outer layer being transparent so that a pet in the enclosure can be viewed by a spectatator when the clothing is worn.

* * * * *